(12) United States Patent
Ruellan et al.

(10) Patent No.: US 7,103,879 B2
(45) Date of Patent: Sep. 5, 2006

(54) METHOD AND DEVICE FOR PARTITIONING A COMPUTER PROGRAM

(75) Inventors: Herve Ruellan, Rennes (FR); Jean-Jacques Moreau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 902 days.

(21) Appl. No.: 10/045,073

(22) Filed: Jan. 15, 2002

(65) Prior Publication Data

US 2002/0124240 A1 Sep. 5, 2002

(30) Foreign Application Priority Data

Jan. 16, 2001 (FR) .................................. 01 00532

(51) Int. Cl.
*G06F 9/44* (2006.01)
*G06F 9/45* (2006.01)
*G06F 15/16* (2006.01)
*G06F 9/46* (2006.01)

(52) U.S. Cl. .................. 717/130; 717/140; 717/103; 709/201; 718/106

(58) Field of Classification Search .............. 717/107, 717/108, 104, 130, 168–173, 131, 140, 103; 718/106; 709/201, 245, 246, 232; 719/315
See application file for complete search history.

(56) References Cited

U.S. PATENT DOCUMENTS

| | | | | |
|---|---|---|---|---|
| 5,524,253 A * | 6/1996 | Pham et al. | ................. | 709/202 |
| 5,724,556 A | 3/1998 | Souder et al. | ................. | 395/500 |
| 5,915,113 A | 6/1999 | McDonald et al. | ......... | 395/702 |
| 6,230,312 B1 * | 5/2001 | Hunt | .......................... | 717/108 |
| 6,263,491 B1 * | 7/2001 | Hunt | .......................... | 717/130 |
| 6,269,474 B1 * | 7/2001 | Price | .......................... | 717/104 |
| 6,381,628 B1 * | 4/2002 | Hunt | .......................... | 709/201 |
| 6,629,123 B1 * | 9/2003 | Hunt | .......................... | 718/106 |
| 6,895,578 B1 * | 5/2005 | Kolawa et al. | ............. | 717/130 |
| 6,922,685 B1 * | 7/2005 | Greene et al. | ................. | 707/1 |
| 6,957,422 B1 * | 10/2005 | Hunt | .......................... | 717/130 |
| 6,983,463 B1 * | 1/2006 | Hunt | .......................... | 719/316 |

FOREIGN PATENT DOCUMENTS

| | | | |
|---|---|---|---|
| EP | 0 767 430 A | 4/1997 | |
| FR | 2 791 789 A | 10/2000 | |

OTHER PUBLICATIONS

TITLE: Partitioning and Optimizing Controllers Synthesized from Hierarchical High-Level Descriptions, author: Seawright et al, ACM, 1998.*
TITLE: A Group-Theoretic Approach to Data and Code Partitioning, author: Besch et al, ACM, 1998.*
Hunt, G.C., "Automatic Distributed Partitioning of Component-Based Applications," PH.D. Dissertation—University of Rochester (Jul. 1998), Rochester, N.Y., USA, <URL:http://research.microsoft.com/{galenh/Publications/HuntThesis.pdf>.

(Continued)

*Primary Examiner*—Chameli C. Das
(74) *Attorney, Agent, or Firm*—Fitzpatrick, Cella, Harper & Scinto

(57) ABSTRACT

The invention concerns a method of partitioning a computer program situated on a first processing site, the program containing subprograms able to transfer information, characterised in that it includes a step of automatic determination, for at least one of said subprograms, of data representing the transfer of at least part of the information processed by said subprogram, and a step of allocating said subprogram to a second processing site according to said data.

21 Claims, 15 Drawing Sheets

OTHER PUBLICATIONS

Lindsey, B., et al., "*Partitioning VisualAge Generator Systems,*" The IBM VisualAg Generator Newsletter, vol. 4, No. 2 (Apr. 1999), pp. 7-12, XP002178539, <URL:http://www-4.ibm.com/software/ad/visgenen/library/vag4n2,pdf>.

Schafers, L., et al., "*Trapper: A Graphical Programming Environment For Parall I Systems,*" Future Generations Computer Systems, Elsevier Science Publishers, Amsterdam, NL. vol. 11, No. 4 (Aug. 1, 1995), pp. 351-361, XP004062425, ISSN: 0167-739X.

Donnett, J.G., et al., "*Effective Algorithms for Partitioning Distributed Programs,*" Seventh Annual International Phoenix Conference on Computers And Communications, 1998 Conference Proceedings (CAT. No. TH0188-3), Scottsdale, Arizona, USA (Mar. 16-18, 1998), pp. 363-368, XP002178540.

\* cited by examiner

FIG. 5a

```
       void SP11
       {
           string STR_TEMP;
L411 →     STR_TEMP = SP12(3, "example");
L412 →     OPEN(DB3);
L413 →     WRITE(STR_TEMP, DB3);
           ...
       } string SP12(integer N, string STR1)
       {
           string STR2;
L414 →     OPEN(DB1);
L415 →     WRITE(STR1, DB1);
L416 →     STR2=READ(DB1);
           ...
L417 →     return STR2;
       }
```
⌐ 210

FIG. 5b

```
       void SP11
       {
           string STR_TEMP;
L421 →     SP_CALLER     ← STACK;
L422 →     INC_CALLS(SP_CALLER, SP11)
L411 →     STR_TEMP=SP12(3, "example");
L423 →     XOP(DB3);
L424 →     XWRT(STR_TEMP, DB1);
           ...
       } string SP12(integer N, string STR1)
       {
           string STR2;
L421 →     SP_CALLER     ← STACK;
L422 →     INC_CALLS(SP_CALLER, SP12)
L425 →     TOTAL(SP_CALLER, SP12,
                 QE=sizeof(N) + strlen(STR1), INPUT);
L426 →     XOP(DB1);
L427 →     XWRT(STR1, DB1);
L428 →     STR2=XRD(DB1);
L429 →     TOTAL(SP_CALLER, SP12,
                 QS = strlen(STR2), OUTPUT);
L417 →     return STR2;
       }
```
⌐ 210

| Calling Subprogram | Called Subprogram | Number of calls | Quantity of information transferred from caller to called (bytes) | Quantity of information transferred from called to caller (bytes) | Sum of transfer times (secs) |
|---|---|---|---|---|---|
| SP11 | SP12 | 1 | 11 | 13 | 0.0524 |
| SP12 | DB1 | 3 | 16 | 13 | 0.1587 |

INPUT   OUTPUT

FIG. 7a

| Calling Subprogram | Called Subprogram | Number of calls | Quantity of information transferred from caller to called (bytes) | Quantity of information transferred from called to caller (bytes) | Sum of transfer times (secs) |
|---|---|---|---|---|---|
| SP1 | SP2 | 300 | 5,000 | 45,000 | 20 |
| SP1 | SP3 | 550 | 5,000 | 20,000 | 30 |
| SP2 | SP4 | 18 | 800 | 200 | 1 |
| SP2 | SP5 | 1600 | 5,000 | 150,000 | 100 |
| SP2 | SP9 | 150 | 8,000 | 17,000 | 10 |
| SP3 | SP20 | 95 | 500 | 2,000 | 5 |
| SP3 | SP6 | 190 | 2,000 | 3,000 | 10 |
| SP4 | SP7 | 1500 | 1,000 | 249,000 | 100 |
| SP5 | SP8 | 90 | 1,000 | 4,000 | 5 |
| SP5 | DB1 | 350 | 16,000 | 9,000 | 20 |
| SP6 | DB1 | 150 | 5,000 | 20,000 | 10 |
| SP7 | DB1 | 900 | 15,000 | 35,000 | 50 |
| SP8 | DB1 | 50 | 500 | 24,500 | 5 |
| SP9 | DB2 | 350 | 5,000 | 20,000 | 20 |
| SP20 | DB2 | 1500 | 5,000 | 245,000 | 100 |
|  |  |  | INPUT | OUTPUT |  |

FIG. 7b

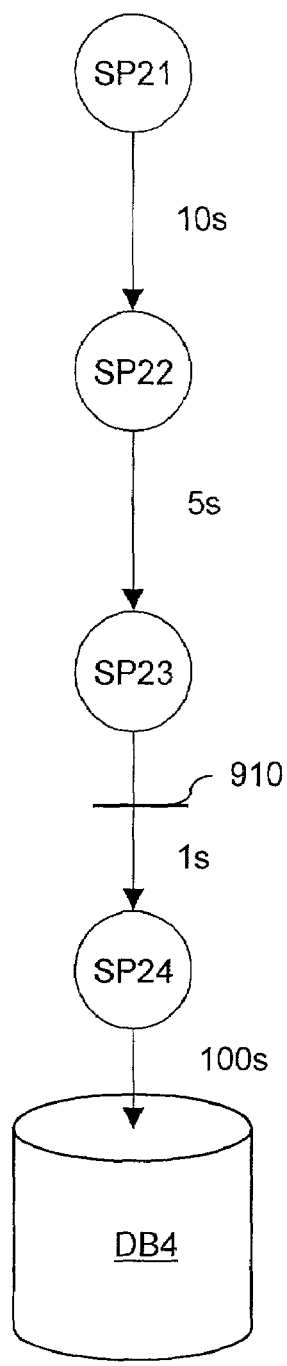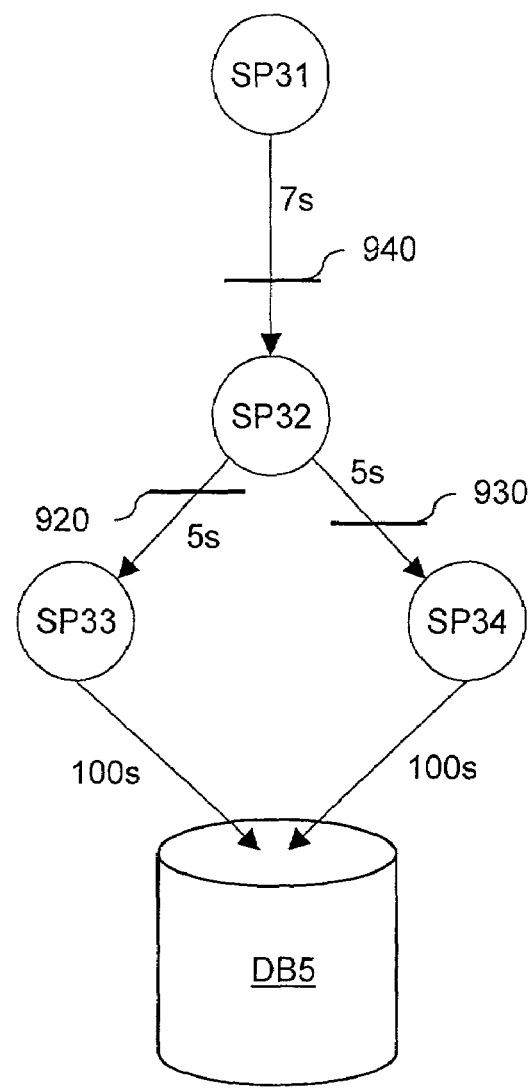
FIG. 9a  FIG. 9b

METHOD AND DEVICE FOR PARTITIONING A COMPUTER PROGRAM

The present invention concerns in general terms the methods and devices for partitioning computer programs of the type used for the design of distributed computer programs.

More particularly, the present invention relates to the partitioning of computer programs able to access information distributed over several sites in a computer network. Conventionally, this information comes from data sources such as, for example, computer files, databases or user inputs.

It should first of all be noted that, in the case of such computer programs, many parameters can affect the transfer and processing time for this information. Amongst these parameters, there will be found, non-exhaustively, characteristics peculiar to the information itself, such as the volume of the information to be processed, but also characteristics of the communication networks connecting the different sites, and of course characteristics peculiar to the computers using these programs. The design of such programs is therefore particularly complex.

The methods and devices for partitioning conventional computer programs afford an aid to the design of such distributed programs. As it is known, they make it possible on the one hand to define a design model for the distributed application and on the other hand to carry out an analysis, by means of a certain number of measurements of the behaviour of the application in this design model.

There is known, for example through U.S. Pat. No. 5,724,556, a method of designing a distributed program accessing information liable to be distributed over several sites. This method enables the user to define a partitioning of this information into subsets of information and a partitioning of the instructions of the distributed program into modules, and to group together these subsets of information and these modules in subprograms. The designer can then define a distributed program model corresponding to a particular distribution of these subprograms on several sites.

The method subsequently allows analysis of the model thus defined, by the production of data representing performances of the application, for example. Where the results of this analysis are not deemed satisfactory, the user can design a new model and repeat the analysis phase on this new model.

This method described above therefore assists the design of distributed applications, notably those accessing information distributed over several sites. However, it does not allow an automatic partitioning, but on the contrary implements a manual and iterative process requiring, at each step, the design of a new model by the user.

The object of the present invention is, in general terms, a method and device for resolving these design problems more advantageously.

More precisely, the invention concerns a method of partitioning a computer program situated on a first processing site, the program containing subprograms able to transfer information, characterised in that it includes a step of automatic determination, for at least one of said subprograms, of data representing the transfer of at least part of the information processed by said subprogram, and a step of allocating said subprogram to a second processing site according to said data.

Correlatively the invention concerns a device for partitioning a computer program situated on a first processing site, the program containing subprograms able to transfer information, characterised in that it has means of automatic determination, for at least one of said subprograms, of data representing the transfer of at least part of the information processed by said subprogram and means of allocating said subprogram to a second processing site according to said data.

Advantageously, the present invention allows an automatic partitioning of the computer program. By virtue of the phase of automatic determination of the partitionings, the user does not need to define models until a model is obtained whose results are deemed satisfactory. The iterative model design process, which may be long and tedious, is thus avoided. For example, the result of the phase of automatic determination of the partitionings is a list of splitting points of the computer program making it possible to determine the subprograms to be transferred and an allocation site for each of these subprograms.

According to a preferred characteristic, the step of automatic determination of said representative data includes a substep of modifying the source code of the computer program, a substep of compiling the modified code and a substep of obtaining said data representing at least one execution of said modified program.

The modification of the source code, otherwise referred to as "instrumentation of the source code", makes it possible in particular to add variables to the computer program and to create a data structure making it possible to automatically store said data representing the transfer of information processed by the different subprograms. This data structure makes it possible in particular to store the transfers of information between two subprograms or between a subprogram and a data source situated on a remote site.

According to another preferred characteristic, the representative data are obtained statistically, after at least two executions of said modified computer program.

This makes it possible in particular to obtain data representing transfers of different quantities of information and to improve the reliability of the allocation step.

According to another characteristic, the representative data take into account characteristics of a transmission channel between the first processing site and the second processing site, these characteristics being chosen amongst the latency, the bandwidth, the error rate, the mean load on the transmission channel, and a value dependent on a communication protocol.

By automatically varying these different characteristics for each execution of the modified program, the distributed program designer can thus obtain a partitioning which remains of high performance even if the network conditions vary.

The invention also concerns a computer program processing apparatus including the partitioning device, or means of implementing the partitioning method.

An information storage means which can be read by a computer or by a microprocessor, integrated or not into the device, possibly removable, stores a program implementing the partitioning method.

The invention will be more clearly understood in the light of the description which follows, given by way of example and made with reference to the accompanying figures, in which:

FIG. 5a is an example of a program in the form of source code;

FIG. 5b depicts the source code of FIG. 5a after instrumentation according to the invention;

Figure 2:
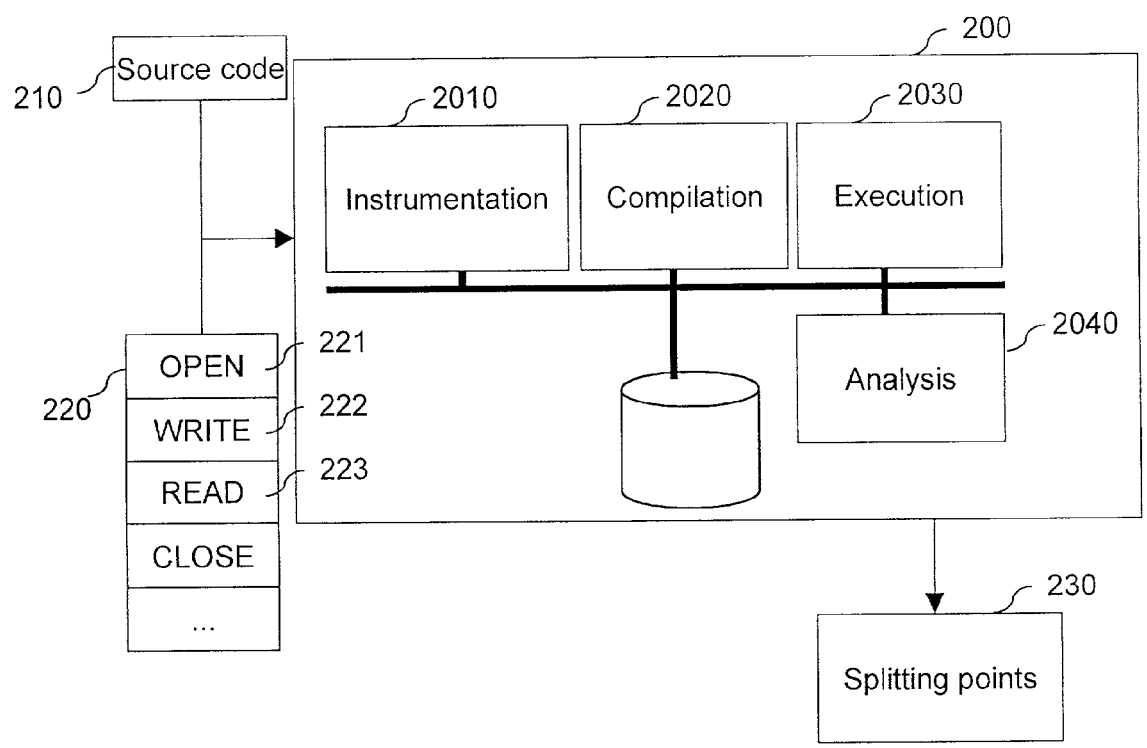
FIG. 2 is a detailed representation of a device according to the invention.
Figure 6A:
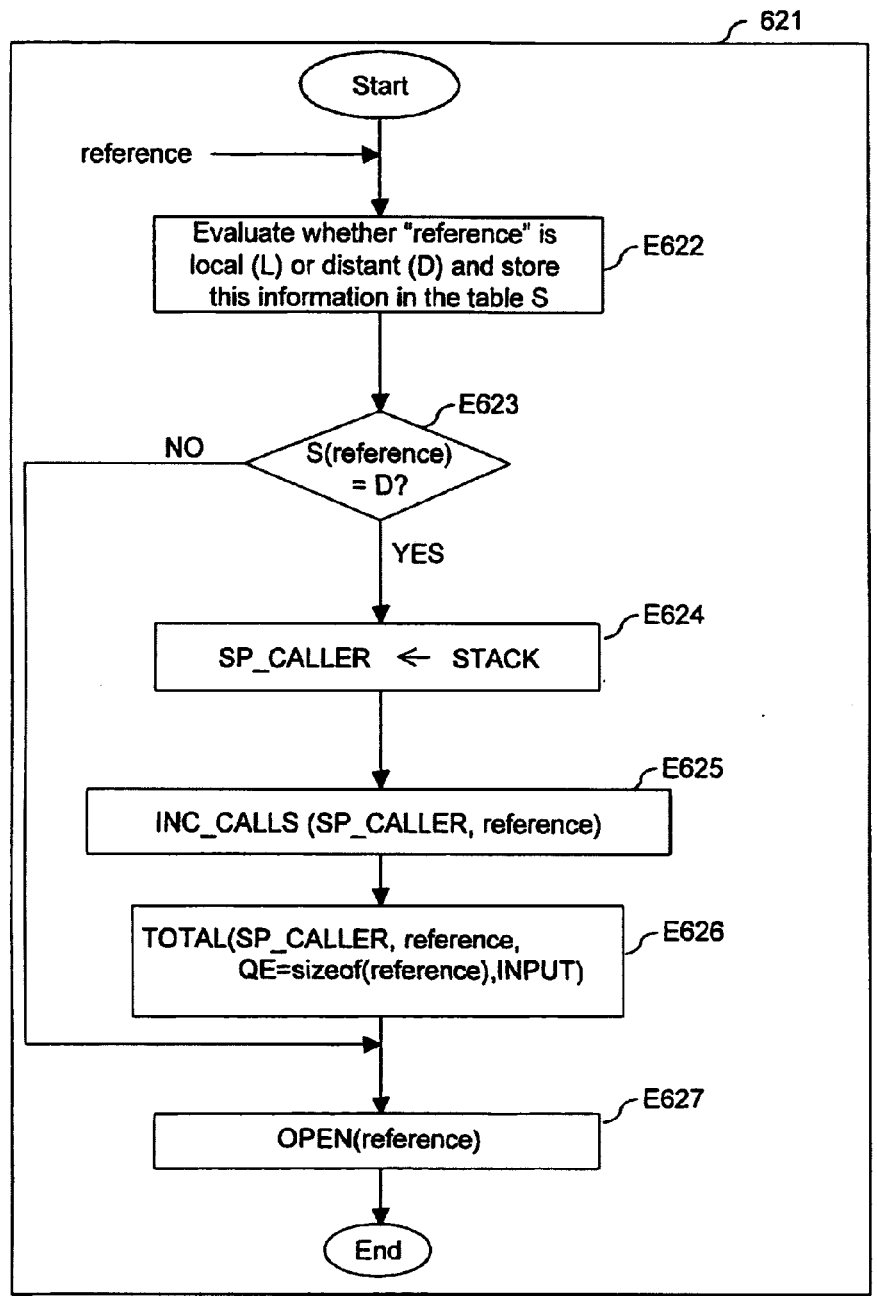
Figures 6B, 6C:
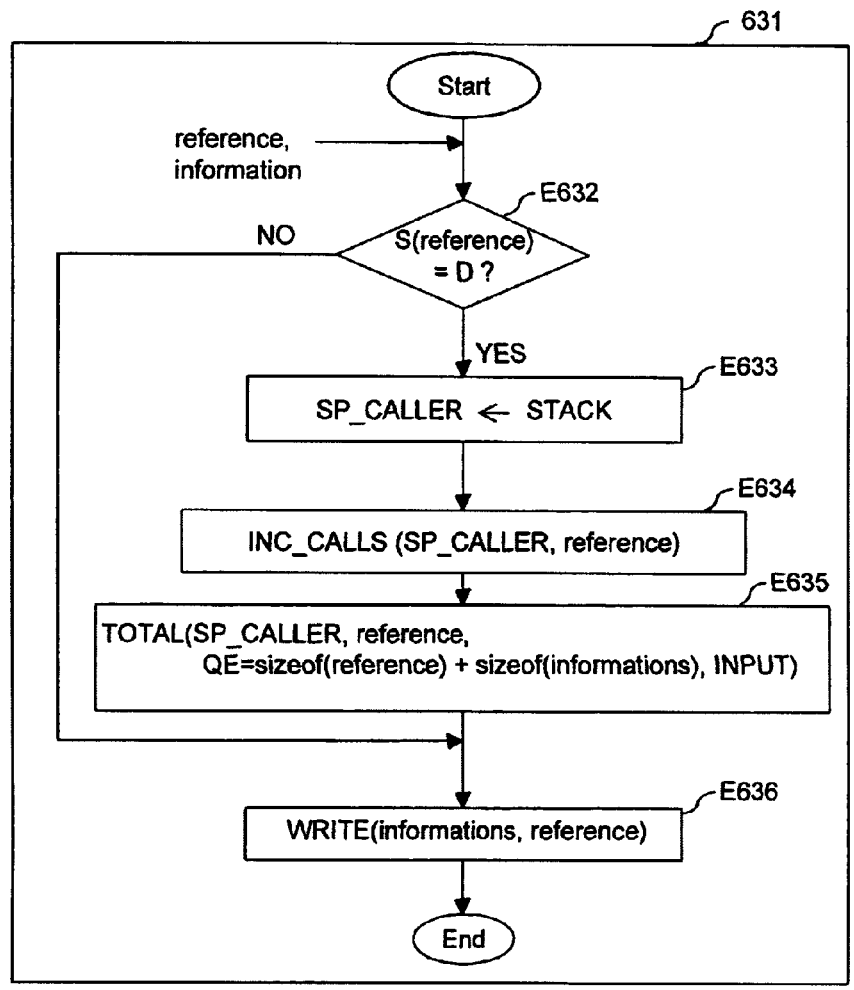
Figure 6D:
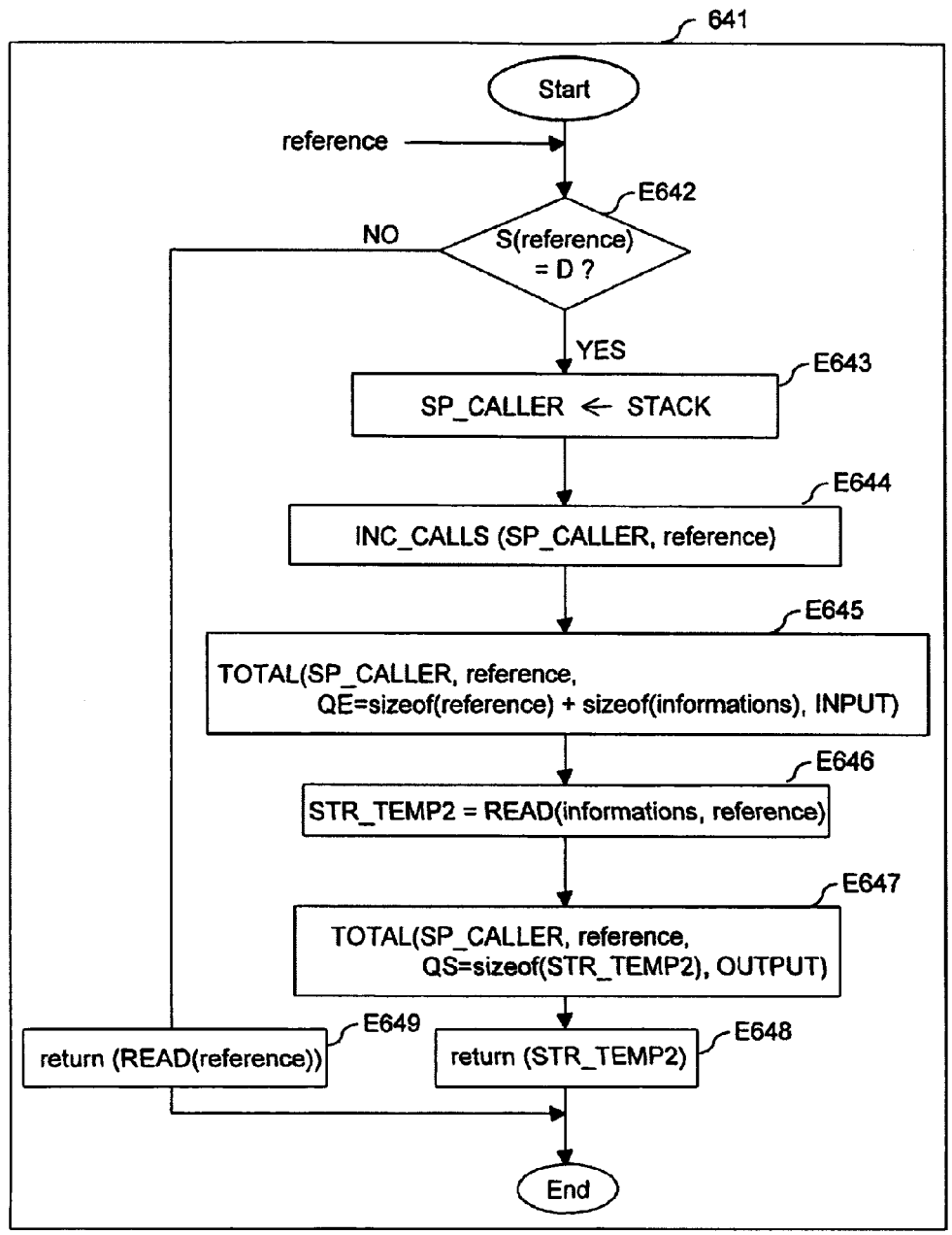
Figure 8:
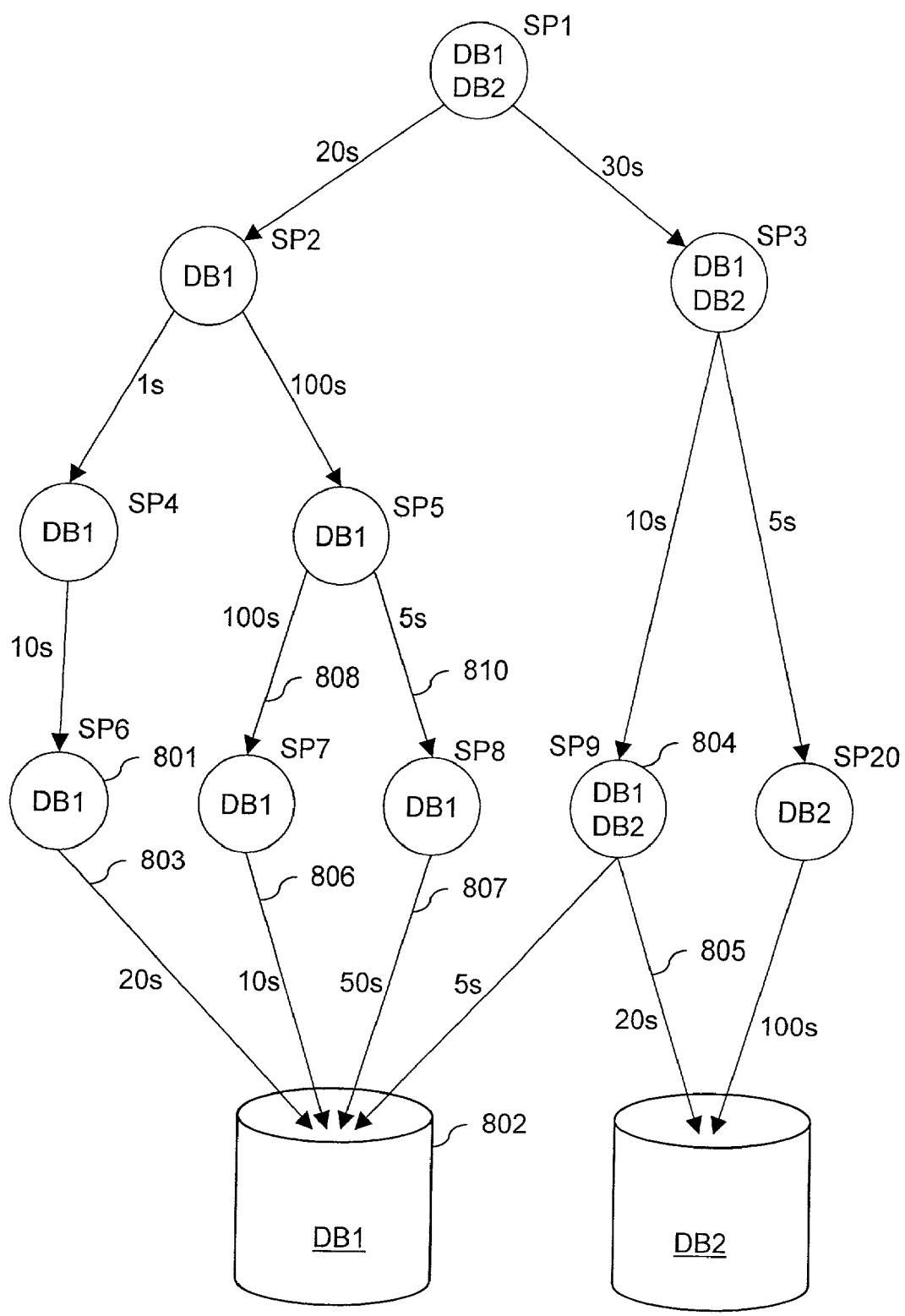
Figure 10:
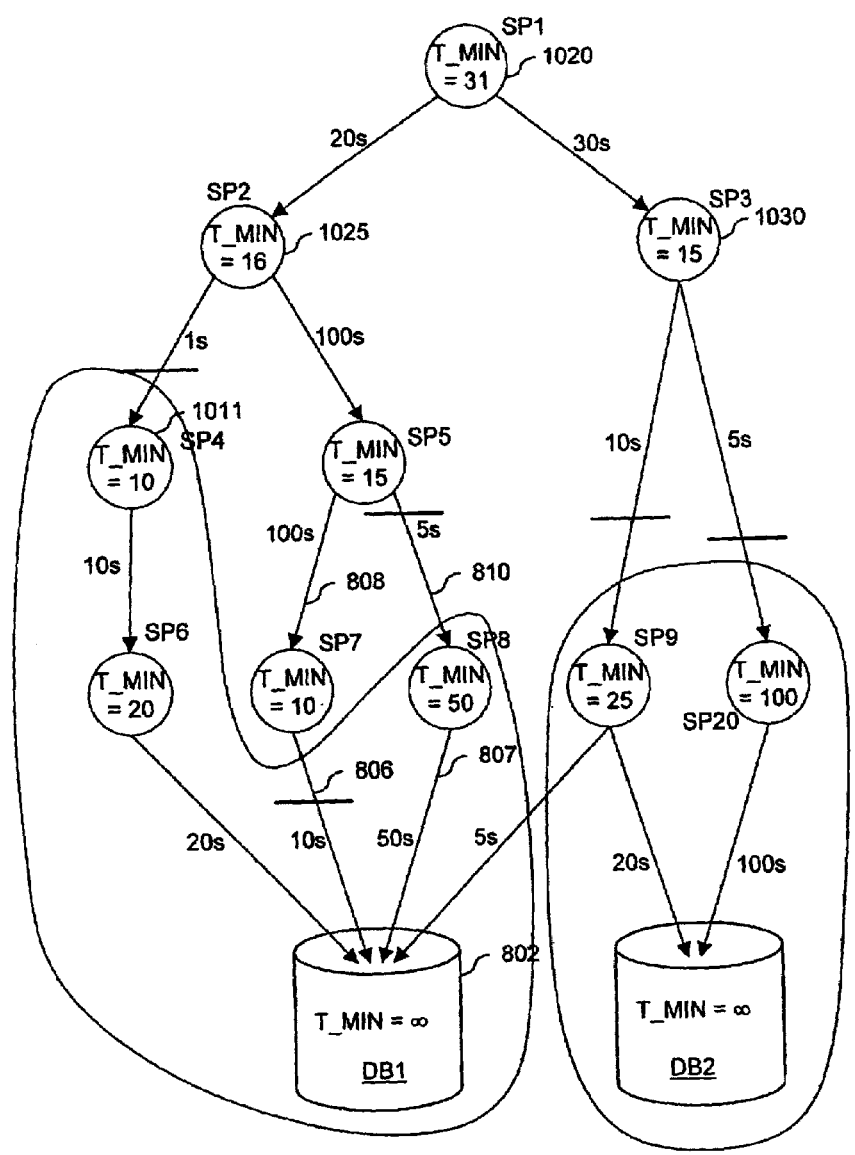
Figure 11:
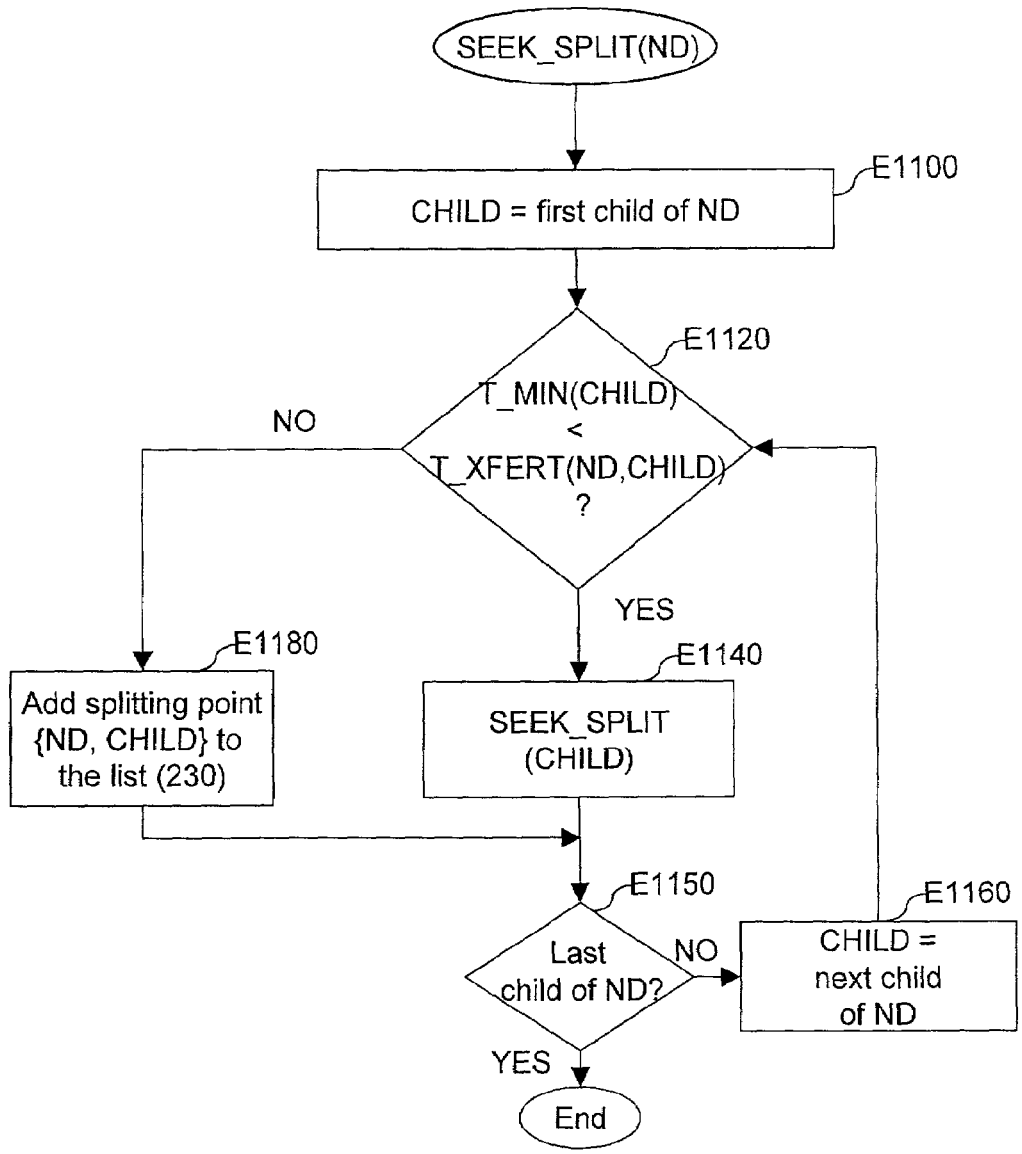
Figure 12:
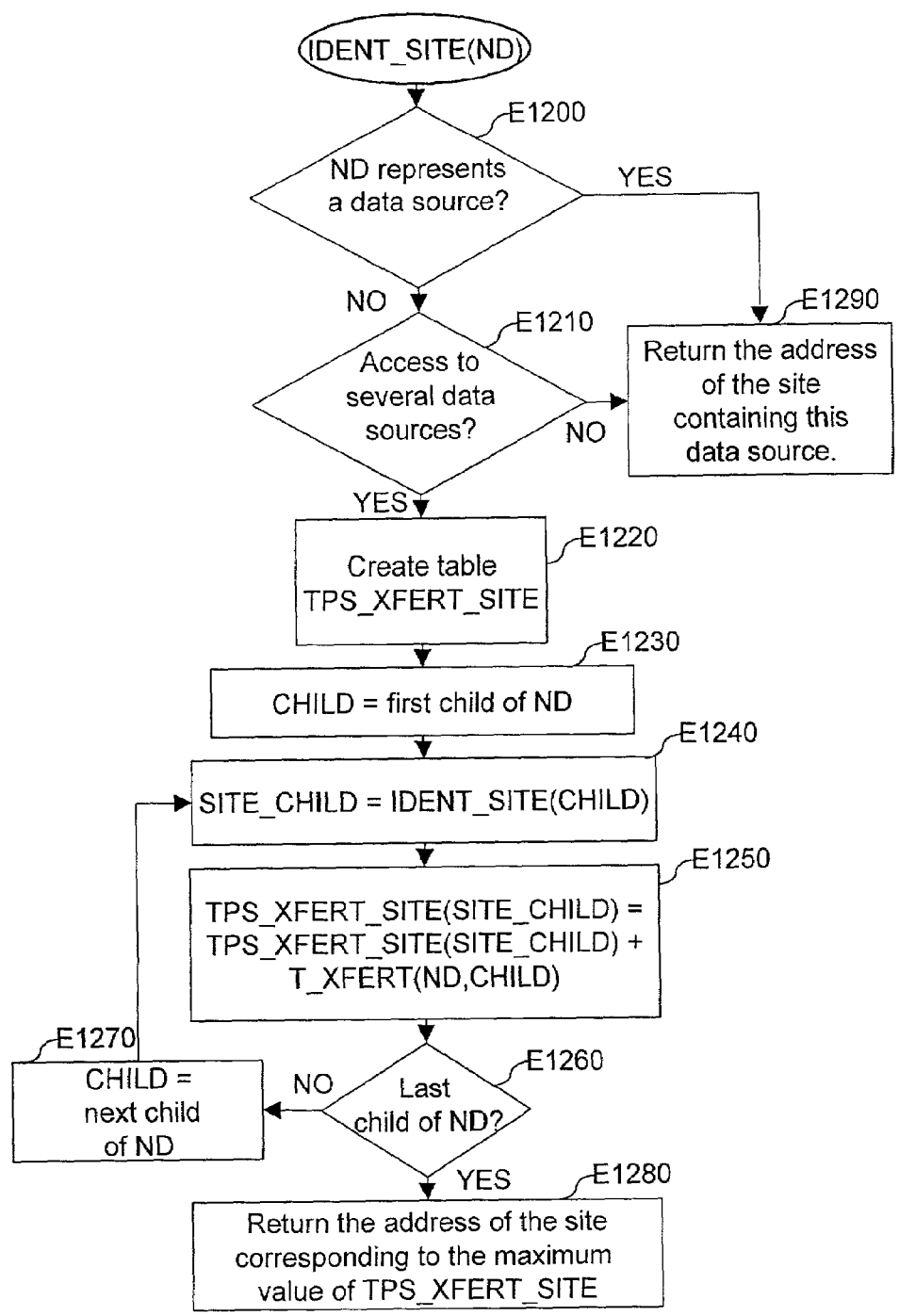

FIGS. 6a, 6c and 6d detail specific functions substituted, during the source code instrumentation phase, for the low-level functions of the table 220 in FIG. 2;

FIG. 6b is a table of information on the location of the data source;

FIGS. 7a and 7b are tables grouping together the data representing the transfer of information;

FIG. 8 is a call diagram obtained from the table in FIG. 7b;

FIGS. 9a and 9b are examples of call diagrams;

FIG. 10 depicts the diagram of FIG. 8 after insertion of splitting points according to the invention;

FIG. 11 depicts the steps of an algorithm for determining the splitting points according to the invention; and FIG. 12 depicts the steps of an algorithm for determining an allocation site according to the invention.

Figure 1:
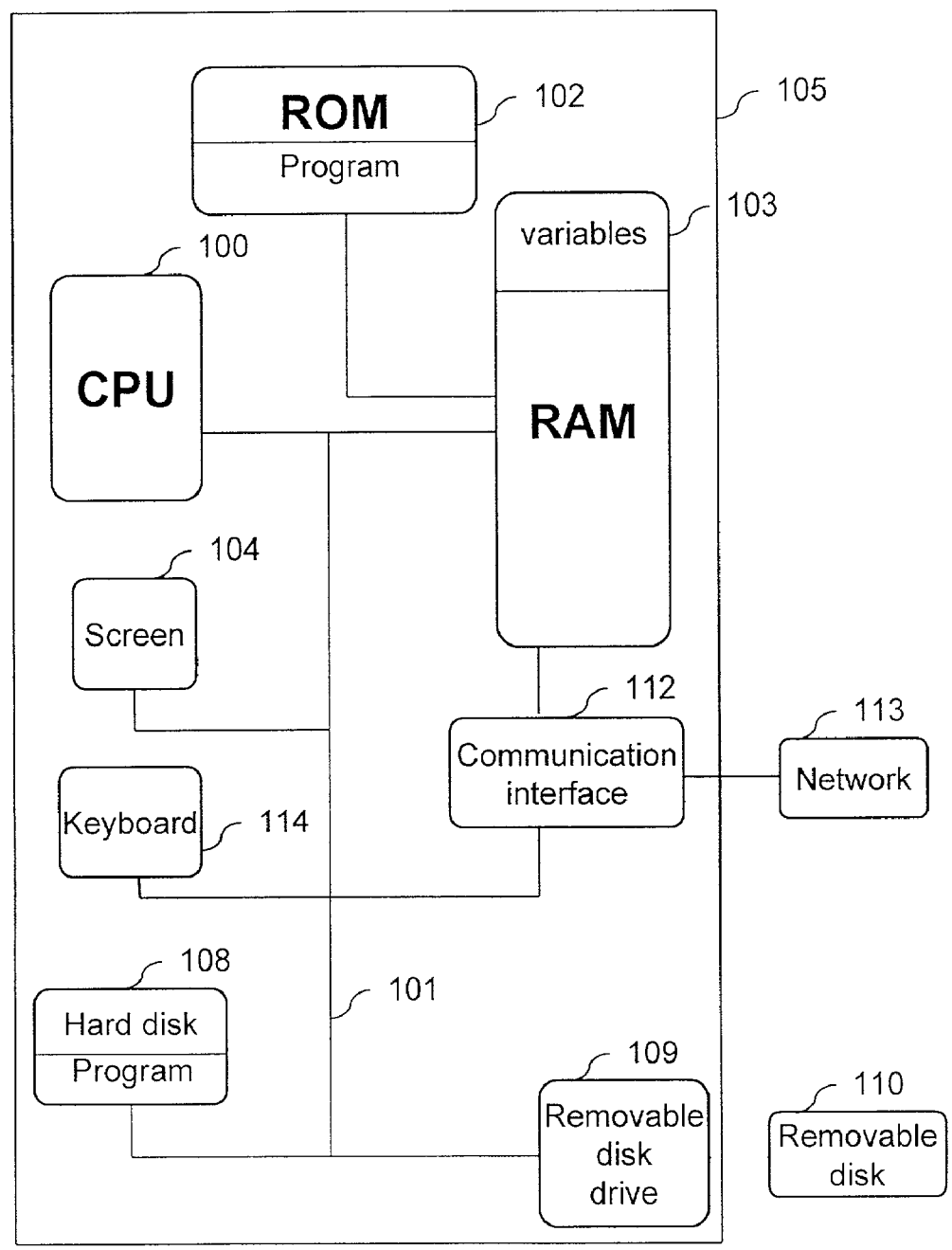
FIG. 1 is an embodiment of a device implementing the invention.

According to the chosen embodiment depicted in FIG. 1, a device implementing the invention is for example a microcomputer 105.

The device 105 has a communication interface 112 connected to a network 113 able to transmit computer programs intended to undergo a partitioning or conversely to transmit results of such a partitioning in the form of files containing splitting points.

The device 105 also has a storage means 108 such as for example a hard disk. It also has a drive 109 for a removable disk 110. This disk 110 may be a diskette, a CD-ROM or a DVD-ROM, for example. The disk 110, like the disk 108, can contain source codes of programs intended to undergo a partitioning according to the invention as well as the program or programs implementing the invention which, once read by the device 105, will be stored on the hard disk 108. According to a variant, the program enabling the device to implement the invention can be stored in a read only memory 102 (referred to as ROM in the drawing). In a second variant, the program can be received and stored in an identical fashion to that described previously by means of the communication network 113.

This same device has a screen 104 for displaying the source code of the program intended to undergo a partitioning or able to serve as an interface with the user, who can thus parameterise certain processing modes by means of the keyboard 114 or any other means (a mouse for example).

The central unit 100 (referred to as CPU in the drawing) executes the instructions relating to the implementation of the invention, instructions stored in the read only memory 102 or in the other storage elements. On powering up, the processing programs stored in a non-volatile memory, for example the ROM 102, are transferred into the random access memory RAM 103, which will then contain the executable code of the invention as well as registers for storing the variables necessary for implementing the invention.

In more general terms, an information storage means, which can be read by a computer or by a microprocessor, integrated or not into the device, possibly removable, stores a program implementing the computer program partitioning method.

The communication bus 101 allows communication between the different elements included in the microcomputer 105 or connected to it. The representation of the bus 101 is not limitative and notably the central unit 100 is able to communicate instructions to any element of the microcomputer 105 directly or by means of another element of the microcomputer 105.

With reference to FIG. 2, an embodiment of a computer program partitioning device 200 according to the invention is intended to effect a partitioning of a computer program received in the form of source code 210. The device 200 also receives as an input a list 220 of the low-level functions relating to access to the reading and writing of information. This information is for example organised in computer files or in data sources situated on storage sites. These low-level functions are for example the system functions for opening 221 and closing files, and the system functions for writing 222 and reading 223 information in a file.

The device according to the invention has means 2010 of instrumentation of a computer source code.

These means consist for example of a computer program of the profiler type such as the program "prof" of the UNIX operating system. Whatever the case, these instrumentation means make it possible, using predefined rules, to insert or modify lines of code in the source code 210. These lines of code will be described with reference to FIGS. 5a and 5b. They make it possible in particular, when executed, to make measurements which will make it possible to calculate data representing information transfers. In addition, calls to the low-level functions of the table 220 are systematically replaced by calls to specific functions for determining, in particular, the sources and the targets of the information transfers. These specific functions will be described subsequently with reference to FIGS. 6a, 6c and 6d.

The device 200 also has means 2020 of compiling the program instrumented by the instrumentation means 2010. These compilation means are known to experts and will not be described.

The device 200 also has means 2030 of executing the instrumented and compiled program. These means include in particular means for starting and stopping the execution of a computer program, as well as means of measuring this duration of execution. These means also make it possible to total the measurements made by the execution of the instrumented code in the table 700, which will be described with reference to FIGS. 7a and 7b. Such means can in particular be implemented by computer programs similar to those used in the tools for debugging and emulating computer programs.

The device 200 also has means 2040 of analysing the representative data totalled in the table 700 by the execution means. These analysis means are in particular adapted to construct a call diagram and to determine the splitting points in this diagram for minimising the transfer of information exchanged between distant sites. These means consist for example of circuits implementing the methods described below with reference to FIGS. 10, 11 and 12.

Finally, the device 200 is adapted to supply to the user, for example in the form of a file, a list 230 of the splitting points determined by the analysis means 2040. This file can be recorded, for example, on the hard disk 108 in FIG. 1.

Figure 3A:
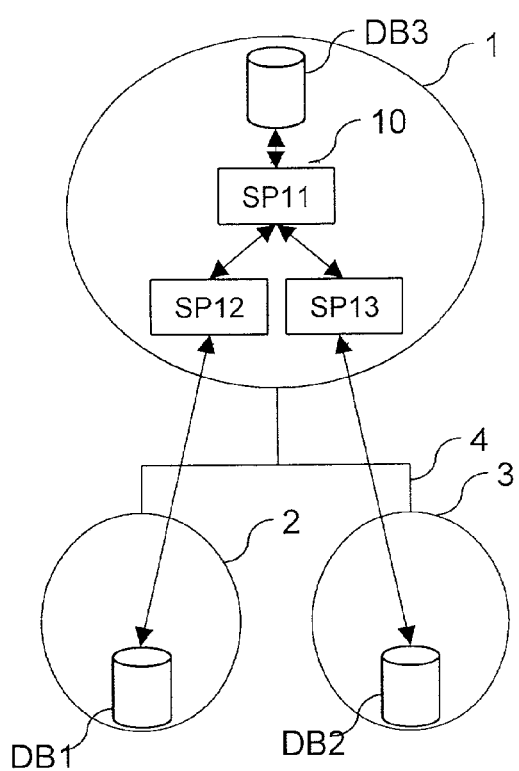
FIG. 3a is an example of a computer program able to undergo a partitioning according to the invention.

FIG. 3a depicts a computer program 10 able to undergo a partitioning according to the invention. The program 10 described here consists of three subprograms SP11, SP12 and SP13, all situated on a processing site 1. The subprograms SP12 and SP13 directly access information situated on information storage sites 2 and 3, via a communication network 4. This information is for example contained in data sources DB1 and DB2 situated physically in each of these sites. The subprogram SP11, invoking these subprograms SP12 and SP13, also accesses this information, but indirectly. Finally, the subprogram SP11 accesses information contained in a data source DB3, situated on the processing site 1 of the program 10.

Figure 3B:
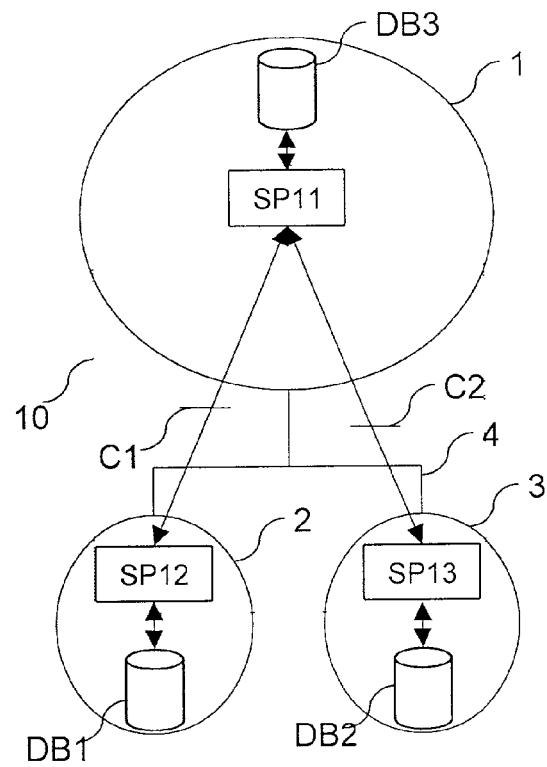
FIG. 3b depicts the program of FIG. 3a after partitioning.

FIG. 3b depicts the program 10 after it has undergone a partitioning according to the invention. For example, the subprogram SP12 has been allocated to the site 2, for the purpose of reducing the execution time for the program 10. Thus the information transferred between the subprogram SP12 and the data source DB1 are now transferred locally within the site 2. On the other hand, information still passes over the network 4, in particular between sites 1 and 2 when the subprogram SP11 invokes the subprogram SP12.

In concrete terms, the call to the subprogram SP12 from the subprogram SP11 has been transformed into a distant call. It will be said in this case that a splitting point C1 has been inserted in the subprogram SP11 at the place of the call to the subprogram SP12. Likewise a splitting point C2 has been inserted in the program SP11 at the place of the call to the subprogram SP13 which was allocated to the site 3.

In searching for these splitting points, it is assumed that the program must always be started up from the original execution site.

The manual insertion of splitting points is known to experts.

Figure 4:
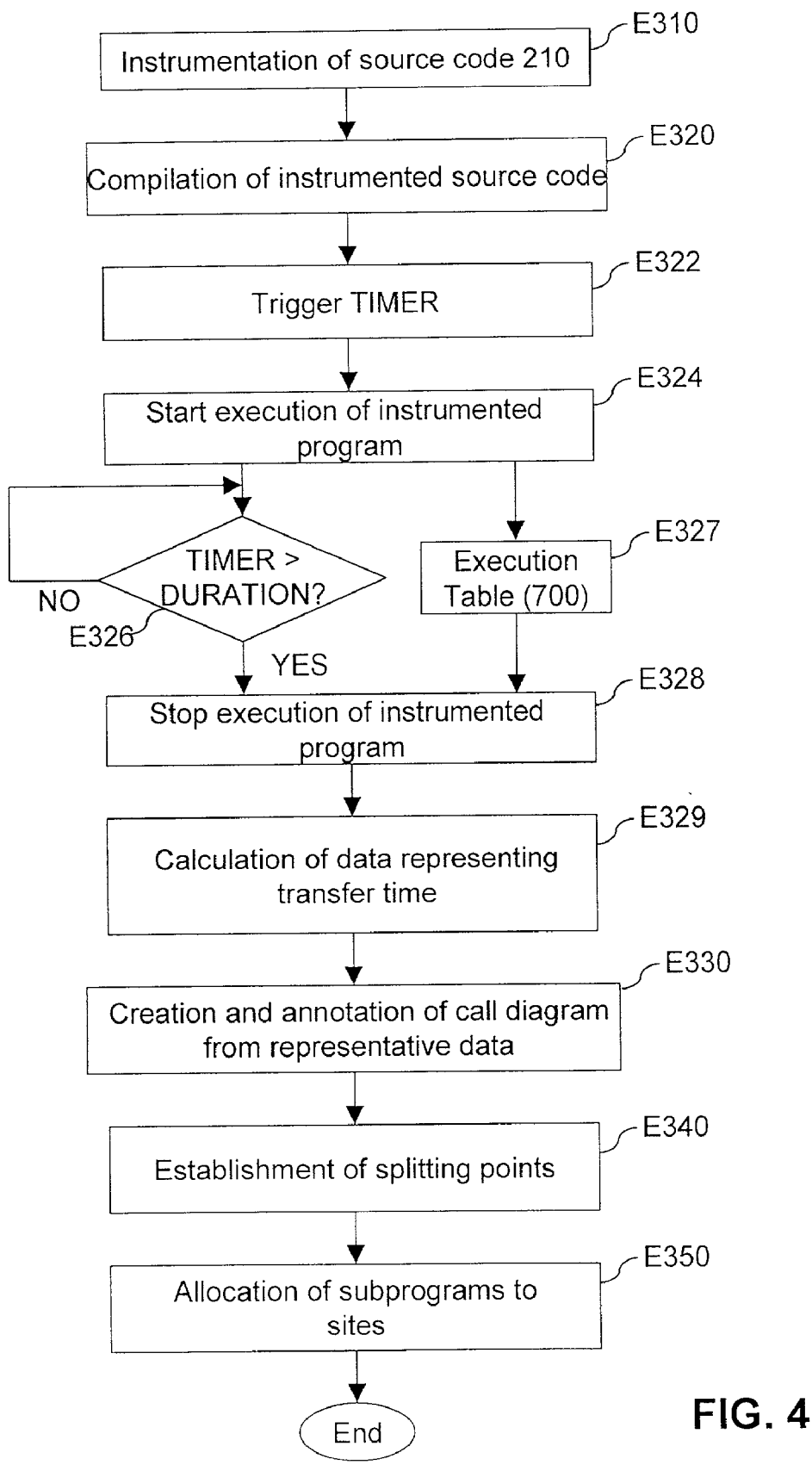
FIG. 4 is an embodiment of the method according to the invention.

FIG. 4 depicts an embodiment of the process according to the invention, comprising steps E310 to E350.

It includes a first step E310 of instrumentation of the source code 210 which will be described with reference to FIGS. 5a and 5b.

FIG. 5a is an example of source code 210, corresponding to lines L411 to L417 of the source code of the program 10 of FIG. 3a.

In the example described here, the subprogram SP11 neither receives nor returns any parameter.

On line L411, the subprogram SP11 invokes the subprogram SP12 with two input parameters: the integer "3" and the chain of characters "example". The value returned by the subprogram SP12 is allocated to a variable STR_TEMP of the chain of characters type, which is written in the data source DB3 on line L413.

In the example described here, the subprogram SP12 receives a first integer input parameter N and a second input parameter STRL in the form of a chain of characters. In the example of the call by SP11 described above, the parameters N and STR1 will respectively take the values 3 and "example".

On line L414, the subprogram SP12 opens the data source DB1. This operation is performed by the execution of the low-level function OPEN 221 in the list of low-level functions 220 in FIG. 2. Then on line L415 it writes the chain of characters STRL corresponding to its second input parameter in the data source DB1. This operation is effected by the execution of the low-level function WRITE 222 in the list of low-level functions 220. The result of this operation will in this example be the writing of the chain of characters "example" in the data source DB1.

In the same way, on line L416, the subprogram SP12 reads a value from the data source DB1 by executing the low-level function READ 223 in the list of low-level functions 220. This value read, which will be assumed to be the chain of characters "other_example", is allocated to the variable STR2.

This value is then returned to the calling subprogram, SP11 in this example, on line L417.

The subprogram SP11 thus recovers the chain of characters "other_example" and allocates it to the variable STR_TEMP on line L411.

On line L412, the subprogram SP11 opens the data source DB3. This operation is effected by the execution of the low-level function OPEN 221 in the list of low-level functions 220 in FIG. 2. Then on line L413 it writes the chain of characters STR_TEMP in the data source DB3. This operation is effected by the execution of the low-level function WRITE 222 in the list of low-level functions 220. The result of this operation will in this example be the writing of the chain of characters "other_example" in the data source DB3.

FIG. 5b shows the source code 210' corresponding to the instrumentation of the source code 210 in FIG. 5a. Once compiled, the execution of the instrumented program will make it possible to obtain the data representing time and quantities of transfer of information.

First of all a first line L421 is inserted at the start of each of the subprograms of the program 10. This first line allocates to a variable SP_CALLER the reference of the calling program. This reference is for example obtained from the execution stack of the subprogram currently being instrumented. The use of such an execution stack is known to experts, notably for debugging computer programs, and will therefore not be described.

Then a second line L422 is inserted following the line L421. This line L422 invokes the function INC_CALLS with two input parameters. The first input parameter corresponds to the variable SP_CALLER allocated at line L421. The second parameter corresponds to the reference of the subprogram currently being instrumented, that is to say "SP11" during the instrumentation of the subprogram SP11 and "SP12" during the instrumentation of the subprogram SP12.

For each subprogram with input parameters, the instrumentation next inserts a line L425. This line L425 makes it possible on the one hand to obtain the size QE of the information received as an input by the subprogram currently being instrumented, and on the other hand to effect, by invoking a function TOTAL, the total of the size of this information received as an input throughout the execution of the instrumented subprogram.

As illustrated in FIG. 5b, this line is not inserted for the subprogram SP11, which has no input parameter, and the total of the size of this information is 0 for this subprogram. For the subprogram SP12, on the other hand, the variable QE will have as its value the size of the input parameters of SP12, that is to say the sum of the size of the integer N and of the size of the chain of characters STR1. The function TOTAL, for its part, receives four input parameters, corresponding respectively to the reference of the calling subprogram, to the reference of the called subprogram, to the variable QE and to the index of the column in the table 700 where the total is to be stored. In the case of input parameters, as on line L425, these data are stored in the column INPUT in the table 700, as described below.

Likewise, for each subprogram with output parameters, the instrumentation inserts, at the end of the source code of the subprogram, a line L429. This line L429 makes it possible on the one hand to obtain the size QS of the information returned by the subprogram currently being instrumented and on the other hand, via the function TOTAL, to effect the total of the size of this information throughout the execution of the instrumented program. For the case of the output parameters, the total is effected in the column OUTPUT in the table 700.

As illustrated in FIG. 5b, this line is not inserted for the subprogram SP11, which has no output parameter. For the subprogram SP12, on the other hand, the variable QS will have as its value the size of the output parameters of this subprogram, that is to say the size of the chain of characters STR2.

Finally, the instrumentation replaces each call to a low-level function in the list 220 in FIG. 2 with a call to a corresponding specific function. These specific functions, which will be described with reference to FIGS. 6a, 6c and 6d, make it possible on the one hand to identify which information is transferred from or to a distant storage site, and on the other hand to obtain the quantity of this information. These specific functions keep the input and output parameters of the original low-level function.

For example, each call to the low-level function OPEN 221 is replaced by a call to a function XOP 621.

In an identical fashion, a low-level function CLOSE, not shown here, would have been replaced at the instrumentation step by a function XCL.

Thus lines L412, L413, L414, L415 and L416 in FIG. 5a are replaced respectively with lines L423, L424, L426, L427 and L428 in FIG. 5b.

With reference once again to FIG. 4, the instrumentation step E310 of the program is followed by step E320. Step E320 is the compilation of the source code instrumented at step E310. The compilation is conventional and will therefore not be described here. At the end of this step, the instrumented program 10 can be executed and the data representing the information transfer will be obtained.

The program then switches to the step E322 of triggering a counter TIMER. This counter TIMER measures a duration of execution of the instrumented program, as stated below.

Steps E324, E326 and E328 control the execution of the program 10 previously instrumented and compiled. This execution is started at step E324 and continues as long as the result of the test of step E326, comparing the value of the variable TIMER with a constant DURATION, is negative. When the variable TIMER becomes greater than this constant, the result of test E326 becomes positive and the execution of the instrumented and compiled program 10 is stopped at step E328.

The execution of the instrumented and compiled program 10 takes place at step E327 as long as the result of test E326 is negative. This step E327 obtains the data representing the information transfer. These data are grouped together in the table 700 in FIG. 7a, as described below.

A description will be given here of how these data are obtained in the case of the invocation of the subprogram SP12 by the subprogram SP11. The first line of the instrumented subprogram SP12 executed is line L421 (see FIG. 5b). When this line is executed, the reference of the calling subprogram SP11 is allocated to the variable $SP_{13}$ CALLER.

Then the method executes the instruction of line L422, which calls upon a function INC_CALLS. This function increments the number of calls of the calling subprogram (in this case the subprogram SP11) to the called subprogram (in this case the subprogram SP12), in the table 700.

The table 700 contains the data representing the information transfer when the computer program 10, instrumented at step E310, is executed. The table 700 includes several lines, each line containing the data representing the transfer of information exchanged between a calling subprogram and a called subprogram. More particularly, at the first call from a calling subprogram to a called subprogram, a line is created in the table 700. The method allocates the reference of the calling subprogram to the first box in this line and the reference of the called subprogram to the second box. The third box, corresponding to the number of calls from the calling subprogram to the called subprogram, is initialised to 1. The boxes in the columns INPUT and OUTPUT, intended to contain respectively the total of the quantities of information exchanged on the one hand from the calling subprogram to the called subprogram and on the other hand from the called subprogram to the calling subprogram, are then initialised to 0. Likewise, the sixth and last column in the table 700 containing the total of the transfer times for the information exchange between the calling subprogram and the called subprogram, is initialised to 0. Naturally, the data totalled in the table 700 are totalled throughout the period of execution of the instrumented program, that is to say as long as the result of test E326 is negative.

During the first execution of the line L422, a line 710 in the table 700 was therefore created, this line containing in its first three boxes the values SP11, SP12 and 1.

Then, when line L425 is executed, the variable QE takes as its value the sum of the sizes of the information received as an input by the subprogram SP12. In this particular case, the input parameters during the call by the subprogram SP11 are the integer 3 and the chain of characters "example". Assuming that an integer is represented by four bytes and a character by one byte, the variable QE takes as its value (4+(1*7)), that is to say 11.

During this same step, the subprogram SP12 calls on a function TOTAL, which will now be described briefly. The function TOTAL receives as an input the reference of the calling subprogram, the reference of the called subprogram, a value to be totalled and the index of the column in the table 700 in which the value is to be totalled. The reference of the calling subprogram, here SP11, and of the called subprogram, here SP12, make it possible to determine the line of the table 700 in which the value must be totalled, line 710 in this case. The variable QE is therefore totalled with the value contained in the box in the column INPUT in line 710.

The instrumented subprogram SP12 then executes line L426. The execution of this line invokes the function XOP 621, which will now be described with reference to FIG. 6a.

The first step E622 of the function XOP 621 evaluates whether the data source received as an input parameter is local, that is to say situated on a site identical to the site of processing of the sub-program currently being executed or if, on the contrary, it is situated on a remote site.

In the case of information transfer over a TCP/IP type network, this evaluation is effected for example by comparing the electronic address of this site, obtained by analysis of its IP address, with the electronic address of the processing site.

Step E622 stores the result of this evaluation in a table S with two columns, shown in FIG. 6b. For each data source accessed, one line is added to the table S. The first box on this line contains the reference of the data source and the second box the value "L" in the case where the data source is situated on a local site and the value "D" in the contrary case.

Thus the execution of line L423 of the instrumented subprogram SP11 fills line 901 in the table S in FIG. 6b. Likewise, line 902 will be filled by the execution of the line L426 of the subprogram SP12.

At the end of step E622, the function XOP executes a test E623 using the table S in FIG. 6b in order to determine whether the data source used as a parameter is local or remote. In the case of a local data source, the result of test E623 is negative and the program switches to step E627, described below.

In the case where the data source is remote, the result of test E623 is positive and the program XOP then executes two steps E624 and E625, which are respectively similar to the instructions in lines L421 and L422 of FIG. 5b. These steps add data to the table 700 in FIG. 7a. In the example described here, the line 720 in the table 700 is created. The first box in this line 720 then receives the reference SP12 of the subprogram which invoked the function XOP, the second box receives the reference DB1 of the data source and the third box receives the value 1 for the first access to the data source DB1 from the subprogram SP12.

The function XOP then executes a step E626 similar to the step of the line L425 in FIG. 5b. During this step, the variable QE takes as its value the sum of the sizes of the information received as an input by the function XOP. In this particular case, the input parameters are limited to the reference "DB1". Assuming that the size of the reference "DB1" is 3 bytes, the variable QE has the value 3.

The value of the variable QE is then totalled with the value contained in the box in the column INPUT on line 720 in the table 700. The value of this box, initially zero, is now 3.

The function XOP then executes, at step E627, the instruction OPEN (DB1) corresponding to the original step of line L414 of the program SP12 in FIG. 5a.

At the end of the execution of line L426 the instrumented subprogram SP12 of FIG. 5b executes line L427. This step invokes the function XWRT 631, which will now be described with reference to FIG. 6c.

The input parameters of the function XWRT are on the one hand the reference of a data source and on the other hand information to be written in this data source.

At step E632, the function XWRT executes a test during which it is checked in the table S of FIG. 6b whether the data source is local or remote. In the case of a local data source, the result of test E632 is negative and the program switches to step E636, where the low-level function WRITE 222 of the table 220 is invoked, which corresponds to the original instruction of line L413 of FIG. 5a.

Where the data source is distant, the result of test E632 is positive and the function XWRT then executes two steps E633 and E634, respectively similar to steps E624 and E625 of FIG. 6a. These steps complete the table 700 in FIG. 7a. In the example described here, the first and second boxes of line 720 of the table 700 already being filled with the references SP12 and DB1, are not modified. On the other hand, the value contained in the third box is incremented by one unit and becomes 2.

The program XWRT then executes a step E635 similar to the step of line L425 of FIG. 5b. During this step, the variable QE takes for the total size input parameters of the function XWRT. In this particular case, the input parameters of this function when it is called by the subprogram SP12 are the chain of seven characters "example" and the reference "DB1". Assuming that the size of the reference "DB1" is 3 bytes, the variable QE takes the value ((1*7)+3), that is to say 10.

The value of the variable QE is then added to the value contained in the box in the column INPUT on line 720 in the table 700. This value therefore becomes 13.

At the end of the execution of the line L427, the instrumented subprogram SP12 executes line L428. This line contains a call to the function XRD 641 depicted in FIG. 6d and which will now be described.

The input parameter of the function XRD is the reference of a data source from which information must be read.

At step E642, the function XRD executes a test during which it is checked, in the table S in FIG. 6b, whether the data source is local or remote. In the case of a local data source the result of test E642 is negative and the function switches to step E649, where the low-level function READ 223 in the table 220 is called, which corresponds to the original instruction of line L416 in FIG. 5a.

Where the data source is distant, the result of test E642 is positive and the program XRD then executes two steps E643 and E644, respectively similar to steps E624 and E625 of FIG. 6a. These steps supplement the table 700 in FIG. 7a.

In the example described here, the first and second columns on line 720 in the table 700 already contain the references SP12 and DB1 and are not modified. The value contained in the third column is incremented by one unit and becomes 3.

The function XRD then executes a step E645 similar to the step on line L425 in FIG. 5b. During this step, the variable QE takes as its value the size of the information received as an input by XRD. In this particular case, the input parameter at the time of the call by the subprogram SP12 is the reference "DB1", and the value 3 is added to the value already contained in the column INPUT on line 720 in the table 700. The latter value therefore becomes 16.

Then, during step E646, the data source DB1 is read by execution of the low-level function READ 223 in the table 220 and the returned value is allocated to a variable STR_TEMP2. It will be assumed that this information read corresponds to the chain of characters "other_example", 13 bytes in size. This information will be that which will be returned by the function XRD to the calling subprogram. This step E646 corresponds to the original instruction in line L416 in FIG. 5a.

Next, during step E647, in a similar fashion to step E645 already described, the size of the information which is to be returned by the function XRD, that is to say 13 bytes, is added to the value contained in the box in the column OUTPUT on line 720 in the table 700. The latter value was up to then zero and becomes 13.

Finally, the chain of characters "other_example" read at step E646 is returned at step E648 and allocated to the variable STR2 during the execution of line L428 of the subprogram SP12 in FIG. 5b.

The subprogram SP12 instrumented at step E310 then executes line L429 in FIG. 5b. During this execution, the variable QS takes as its value the size of the information returned by the subprogram SP12, that is to say the size of the variable STR2, that is to say 13 in this example. The value of the variable QS is then added to the value contained in the box in the column OUTPUT on line 710 in the table 700. The latter value was zero and becomes 13.

Finally, the subprogram SP12, during the execution of line L417, returns the chain of characters "other_example" to the calling subprogram SP11.

The sixth column in the table 700 in FIG. 7a will now be described. This column contains the data representing the transfer time for the distant information exchanged, on the network 4, either between two subprograms (line 710) or at the time of access to a remote data source (line 720).

These data are calculated, for each of the lines in the table 700, during a step E329, following on from step E328 (FIG. 4). In a preferred manner, these data take account of characteristics of the network 4 such as latency and transmission rate.

For example, for a line in the table 700, the sixth box includes the value of the variable TPS_TOT, calculated as follows:

TPS_TOT=(NB_APP*LATENCY)+(QTE/RATE), where the variable NB_APP corresponds to the value of the third column in the table 700, the variable QTE corresponds to the sum of the values in the boxes in the columns INPUT and OUTPUT and where LATENCY and RATE are constants.

For example, if LATENCY equals 0.05 s/call and RATE equals 10,000 bytes per second, the values for lines 710 and 720 are respectively found to be equal to 0.0524 s and 0.1529 s.

As a variant, other characteristics of the transmission channel, such as the error rate, the average load, or at least one value dependent on the communication protocol, can be used for calculating the data representing the information transfer time.

For example:

$$TPS\_TOT=(NB\_APP/(1-ERR))*(LATENCY+ ((QTE/NB\_APP)+HEADER)/(RATE*(1-LOAD))),$$

where ERR is a value measuring the error rate, HEADER is a number of bytes transmitted in addition to the information, this number being dependent on the communication protocol, and LOAD a value representing the degree of use of the communication network.

Table 700' in FIG. 7b is a table constructed in an identical manner to that of FIG. 7a for all the subprograms of another instrumented computer program which will serve as an example for the remainder of the description.

For example, line 710' in the table 700' indicates that the subprogram SP2 has been called 300 times from the subprogram SP1, that the total volume of the data transferred from the subprogram SP1 to the subprogram SP2 is 5000 bytes, that the total volume of the data transferred from the subprogram SP2 to the subprogram SP1 is 45,000 bytes and that the total transfer time for these data is 20 s.

The step E329 of calculating the data representing the transfer time is followed by a step E330 of creating a call diagram, which will now be described with reference to FIG. 8.

The call diagram in FIG. 8 is obtained recursively by running through the table 700' in FIG. 7b, from the data sources.

During a first phase, the method locates the lines in the table 700' in FIG. 7b corresponding to the transfer of information between a subprogram and a data source. For each of these lines, it constructs a branch on the call diagram between a node representing this subprogram and a representation of the data source. This branch is weighted by the data item representing the transfer time for the information between the subprogram and the data source read in the sixth column in the table 700' in FIG. 7b. Likewise, the reference of the data source is entered in the node representing this subprogram.

Running through the table 700' in FIG. 7b from top to bottom, the first line making reference to a call from a subprogram to a data source is line 731. A node 801 representing the subprogram SP6 is therefore created, and a representation 802 of the data source DB1. Then a branch 803, weighted by the value 20 s read in the sixth column on line 731, is shown. Finally the reference "DB1" is added to the node 801.

The subprograms and the data sources are depicted only once. When the method finds, for example, a subprogram already shown, as is the case on line 732 for the subprogram SP9, another branch 805 is created with the node 804 representing this subprogram SP9 as its origin. The reference of the data source, DB2 in this case, is then added to the node 804.

In a second phase, for each subprogram $SP_i$ already represented by a node, the method seeks, in the table 700' in FIG. 7b, the subprograms $SP_j$ calling this subprogram, and creates a new branch for representing this call. Each new branch is weighted by the data item representing the time for transfer of the information exchanged between the subprogram $SP_j$ and the subprogram $SP_i$, read in the sixth column in the table 700' in FIG. 7b. The references of the data sources contained in the node representing the subprogram $SP_i$ are added to the node representing the subprogram $SP_j$.

This method is repeated for all the subprograms represented by a node in the call diagram. When all the nodes have been processed, the construction of the diagram is terminated.

At the end of step E330, the program switches to a step E340 for establishing splitting points for the instrumented program 10. In the invention described here, "making a split" consists, for a subprogram call, of making this call remote and, for an access to a remote data source, of keeping this access remote. The object of the invention is to effect splits so as to minimise the total data transfer time between the different sites by allocating certain subprograms to certain processing sites containing the remote data.

The mechanism for determining the splitting points will now be explained. Initially, two simple call diagrams depicted in FIGS. 9a and 9b will be considered.

The call diagram in FIG. 9a represents the call diagram for a program composed of four subprograms SP21, SP22, SP23 and SP24. The subprogram SP21 invokes the subprogram SP22, which invokes the subprogram SP23, which itself invokes the subprogram SP24. The subprogram SP24, for its part, transfers information from or to a remote data source DB4.

As previously described, the data representing the transfer time for the exchanged information are shown on the branches connecting the subprograms. For example, the total transfer time for the information exchange between the subprogram SP21 and the subprogram SP22 is 10 s. In the initial configuration, that is to say before the split, the transfers between the different subprograms are local transfers. Only the transfer between the subprogram SP24 and the data source DB4 is a distant transfer.

In the case, for example, where a split 910 is effected at the invocation of the subprogram SP24 by the subprogram SP23, which would correspond to transferring the subprogram SP24 onto the site of the data source DB4, then the transfer of information between the subprogram SP24 and the data source DB4 would become local to the site of the data source DB4. On the other hand, the transfer of information between the subprograms SP23 and SP24 would become a distant transfer. The transfer time corresponding to the data exchanged on the network would thus change from 100 s to 1 s. It is clear that this split of the program minimises the transfer time for the information between the sites.

Consider now the diagram in FIG. 9b. This is a call diagram for a program composed of four subprograms SP31, SP32, SP33 and SP34. The subprogram SP31 invokes the subprogram SP32, which itself invokes the two subprograms SP33 and SP34. The subprograms SP33 and SP34 transfer information from or to a data source DB5.

By following a reasoning which consists simply of effecting splits on the branches of least weight, it might appear preferable to effect on the one hand a first split 920 between the subprograms SP32 and SP33 and on the other hand a second split 930 between the subprograms SP32 and SP34. In this configuration, only the information transfers between the subprograms SP32 and SP33 on the one hand and those between the subprograms SP32 and SP34 on the other hand are distant, which corresponds to a total information transfer time of 5 s+5 s, that is to say 10 s.

On the other hand, by effecting a split 940 between the subprogram SP31 and the subprogram SP32, the only distant transfer, once the subprograms SP32, SP33 and SP34 have been transferred to the site of the data source DB5, becomes the transfer of information between the subprograms SP31 and SP32, where the total information transfer time is 7 s. This transfer time is the minimum that can be obtained.

In order to extend the reasoning given with reference to FIG. 9b, it will now be explained how, for a given subprogram, a transfer time can be calculated for the information exchange between this subprogram and the data sources which it accesses, directly or not.

The minimum transfer time for a node ND representing a subprogram is given by the following formula:

$$\text{T\_MIN}(ND) = \sum_{CHILD} (\min(\text{T\_XFERT}(ND, CHILD), \text{T\_MIN}(CHILD))$$

In other words, this minimum transfer time is the sum, for all the children of the node, of the smaller of the two values consisting on the one hand of the transfer time for the information exchanged between this node and the child and on the other hand the minimum transfer time for this same child.

This formula makes it possible to obtain the values T_MIN(ND) for all the nodes ND in FIG. 8, these values being represented by the corresponding nodes in the diagram in FIG. 10. By convention, the value T_MIN for a data source is infinite.

For example, for the node SP5, which has two children SP7 and SP8, there is obtained:

$$\text{T\_MIN}(SP5) = \min(T\_XFERT(SP7, SP5), T\_MIN(SP7)) + \min(T\_XFERT(SP8, SP5), T\_MIN(SP8))$$

Naturally, for the nodes ND directly accessing one or more data sources, T_MIN(ND) corresponds to the sum of the transfer times for the data exchanged between the subprogram represented by this node and all these data sources.

So, with reference to branches 806 and 807 in FIG. 8, $$T\_MIN(SP7) = 10 \text{ and } T\_MIN(SP8) = 50.$$

Likewise, the values T_XFERT(SP7, SP5) and T_XFERT(SP8, SP5) are read directly on the branches 808 and 810 in FIG. 8.

Finally, T_MIN(SP5)=min (100, 10)+min (5, 50)=10+5=15

By applying this method to each of the nodes in the diagram in FIG. 8, all the values T_MIN in FIG. 10 are obtained.

It will now be explained, still with reference to FIG. 10, how the splitting points are determined. As stated previously, the splitting points selected according to the invention are such that they minimise the transfer times for the distant information. However, the minimum total transfer time for the information transferred directly and indirectly from a subprogram to distant data sources is given by the value T_MIN corresponding to this subprogram.

If, for example, the node 1011 corresponding to the subprogram SP4 is considered, it can be seen that, if the subprogram SP4 remains on the original execution site, it is not possible to have a total transfer time for the information accessed directly or indirectly by SP4 of less than 10 s. However, the transfer time between SP4 and SP2 is 1 s. It is therefore judicious to move SP4 and of course the subprogram SP6 called from SP4, that is to say to make a cut between SP2 and SP4.

The extension of this example will now be given with reference to FIG. 11. FIG. 11 shows the steps of an algorithm SEEK_SPLIT for determining the splitting points which have to be made from a node ND in the call diagram, this node ND being given as an input parameter.

In order to determine all the splitting points in the call diagram in FIG. 10, the algorithm SEEK_SPLIT is first of all invoked with the root 1020 of this diagram as an input parameter.

During a first step E1100, the variable CHILD takes as its value the first child CHILD of ND, that is to say, in this example, the node 1025 representing the subprogram SP2.

During the following step E1120, the values T_MIN (CHILD) and T_XFERT(ND, CHILD) are compared. These values are found respectively in the representation of the node CHILD and on the branch connecting the nodes ND and CHILD in FIG. 10. When ND and CHILD represent the nodes 1020 and 1025, these values are respectively equal to 16 s and 20 s.

When the value T_MIN(CHILD) is strictly less than the value T_XFERT(ND, CHILD), the result of test E1120 is positive. This means that no split must be made between the node CHILD and the node ND. Step E1120 is then followed by a step E1140, during which the algorithm for seeking the splitting points SEEK_SPLIT is implemented with the node CHILD as an input parameter.

In the example described here, the value T_MIN(SP2) (16 s) being less than T_XFERT(SP1, SP2), (20 s), the result of test E1120 is positive and the algorithm for seeking the splitting points is implemented with the node 1025 as the input parameter.

Step E1140 is followed by a test E1150 for testing whether all the children of the node ND have been processed. If such is not the case, the result of test E1150 is negative and, at the following step E1160, the variable CHILD takes as its value the next child of the node ND, that is to say, in this example, the node 1030, representing the subprogram SP3. This step E1160 is followed by the step E1120 already described.

When the value T_MIN(CHILD) is greater than or equal to the value T_XFERT(ND, CHILD), the result of test E1120 is negative. Step E1120 is then followed by a step E1180, during which a splitting point between the node ND and the node CHILD is added to the list 230 (FIG. 2) of the splitting points.

With reference once again to FIG. 4, step E340 is followed by the step E350 of allocating the subprograms to distant sites.

The list of splitting points makes it possible to determine which subprograms must be moved to another site: each subprogram represented by a node situated below a splitting point must be moved. In the case of the program whose call diagram is shown in FIG. 10, the subprograms SP4, SP6, SP8, SP9 and SP20 must be moved.

It should be stated for this purpose that the choice of this site is effected so as to minimise the transfers of information between this subprogram and distant sites. For the subprograms to be moved which access only one data source, that is to say for the subprograms SP4, SP6, SP8 and SP20 in FIG. 10, the site chosen will obviously be the site containing this data source. In the case of the subprograms accessing several data sources, that is to say SP9 in this example, the site chosen will be the site containing the data sources for which the total information transfer between this subprogram and these data sources is at a maximum.

FIG. 12 depicts the steps of an algorithm IDENT_SITE for determining the site to which a subprogram must be moved. This algorithm IDENT_SITE is invoked with an input parameter ND, corresponding to the node representing this subprogram in the call diagram in FIG. 10. FIG. 12 will now be described, using the example of the subprogram SP9 in FIG. 10.

During a first step E1200, the method effects a test during which it tests whether the reference ND received as an input parameter represents a data source. In the affirmative, this step is followed by step E1290 during which the algorithm returns the electronic address of the site containing this data source. In the case of a network of the TCP/IP type, this address will be an Internet address.

In the case where the reference ND represents a subprogram, the result of test E1200 is negative and this step is followed by a step E1210.

During this step, the algorithm tests whether the subprogram represented by the node ND accesses several data sources. It should be noted for this purpose that the list of data sources accessed by a subprogram is marked in the node representing this subprogram (FIG. 8). If the subprogram accesses only one data source, the result of test E1210 is negative. During the following step E1290, the electronic address of the site containing this data source is returned.

In the example described here, the subprogram SP9 accesses two data sources DB1 and DB2 and the result of the test E1210 is positive. Test E1210 is then followed by a step E1220 of creating a table TPS_XFERT_SITE. This table contains as many lines as there are sites containing data sources accessed by the subprogram and two columns. In the first column in this table, there will be found the electronic address of a site containing a data source accessed by this subprogram, and in the second column, initialised to zero, the total of the transfer times for the information exchanged between this subprogram and the different data sources for this site.

Step E1220 is then followed by a step E1230, during which the variable CHILD takes the value of the first child CHILD of ND, that is to say DB1 in this example.

During the following step E1240, the algorithm for determining a site IDENT_SITE is invoked with the variable CHILD as an input parameter, that is to say DB1 in this example.

In this case, the result of the test E1200 will be positive, since the input parameter for this algorithm is the reference of a data source, and the electronic address of the site containing the database DB1, for example "SITE_DB1", will be returned at step E1290.

This electronic address is allocated to the variable SITE_CHILD during step E1240. This step is followed by step E1250, during which the table TPS_XFERT_SITE created at step E1220 is supplemented. More precisely, a line in this table is used for totalling the transfer times for the information exchanged between the subprogram SP9 and the site SITE_DB1. The first time the variable SITE_CHILD takes the value SITE_DB1, the first column in a line in this table receives the value SITE_DB1. The value of the transfer time for the information exchanged between SP9 and DB1, T_XFERT(SP9, DB1) is added to the value contained in the box in the second column in this line. The value of this box, initially zero, therefore takes the value 5.

Step E1250 is followed by a test E1260 for testing whether all the children of the node ND have been processed. If such is not the case, the result of test E1260 is negative, and at the following step E1270 the variable CHILD is modified by the next child of the node ND, that is to say DB2 in this case.

Step E1270 is then followed by step E1240, already described, where the algorithm for determining a site IDENT_SITE is invoked with the value DB2 as the input parameter. In an identical fashion, at step E1250, a line is created in the table TPS_XFERT_SITE with, in the first column, the electronic address of the site containing the data source DB2, that is to say for example "SITE_DB2", and in the second column the value T_XFERT(SP9, DB2), that is to say 20 s.

The result of test E1260 is positive this time, and this step is followed by step E1280. This step returns the electronic address of the site for which the value of the total transfer time in the second column in the table TPS_XFERT_SITE is at a maximum. In the case of the subprogram SP9, step E1280 returns the electronic address "SITE_DB2"

At the end of step E350 in FIG. 4, the user therefore has the electronic addresses of the sites to which certain subprograms must be moved in order to minimise the total information transfer time.

Naturally, the present invention is in no way limited to the embodiments described and depicted, but quite the contrary encompasses any variant within the capability of an expert.

The invention claimed is:

1. A method of partitioning a computer program situated on a first processing site, the program containing subprograms able to transfer information, and the program comprising:
   a step of automatic determination, for at least one of the subprograms, of data representing the transfer of at least part of the information processed by that subprogram, said automatic determination step comprising:
      a substep of modifying source code of the computer program, during which substep are inserted in source code of at least one subprogram of the computer program:
         first lines of instructions making it possible, when they are executed, to obtain and store a reference of a subprogram calling that subprogram; and
         second lines of instructions making it possible, when they are executed, to obtain and store the total of the data representing the information received or transferred by that subprogram;
      a substep of compiling the modified source code and generating a modified program; and
      a substep of obtaining the representative data by means of at least one execution of the modified program;
   and a step of allocating the subprogram to a second processing site according to the data.

2. A method according to claim 1, wherein said substep of modifying the source code includes replacing, in source code of at least one subprogram of the computer program, calls to low-level functions by lines of instructions making it possible, when they are executed, to obtain and store if the data transferred by said subprogram are situated on a distant storage site.

3. A method according to claim 1, wherein the representative data are obtained statistically, after at least two executions of the modified computer program.

4. A method according to claim 1, wherein the data represent a quantity of the part of the information processed by the subprogram.

5. A method according to claim 1, wherein the data represent a transfer time of the part of the information processed by the subprogram.

6. A method according to claim 1, wherein the data represent characteristics of a transmission channel between the first processing site and the second processing site.

7. A method according to claim 6, wherein the data representing the transmission channel are chosen from among latency, bandwidth, error rate, mean load on the transmission channel and at least one value dependent on a protocol for communicating the part of the information between the first processing site and the second processing site.

8. A method according to claim 1, wherein said allocation step is performed so as to minimize, by analysis of the representative data, the transfer of information between the first processing site and the second processing site.

9. A computer, comprising means adapted to implement the method according to any one of claims 1 to 8.

10. An information storage medium which can be read by a computer or by a microprocessor storing instructions of a computer program, making it possible to implement a partitioning method according to any one of claims 1 to 8.

11. The information storage medium according to claim 10, said storage medium being a removable one.

12. A device for partitioning a computer program situated on a first processing site, the program containing subprograms able to transfer information, comprising:
    means of automatic determination, for at least one of the subprograms, of data representing the transfer of at least part of the information processed by that subprogram, said automatic determination means including:
        means for modifying source code of the computer program, said means being adapted to insert in source code of at least one sub-program of the computer program:
            first lines of instructions making it possible, when executed, to obtain and store a reference of a subprogram calling that subprogram; and
            second lines of instructions making it possible, when executed, to obtain and store the total of the data representing the information received or transferred by that subprogram;
        means for compiling the modified source code and generating a modified program; and
        means adapted to obtain the representative data by at least one execution of the modified program; and
    means for allocating the subprogram to a second processing site according to the data.

13. A partitioning device according to claim 12, wherein said means of modifying the source code replace, in the source code of at least one subprogram of the computer program, calls to low-level functions by lines of instructions making it possible, when executed, to obtain and store if the data transferred by that subprogram are stored on a distant storage site.

14. A partitioning device according to claim 12, wherein said means adapted to obtain the representative data operate statistically, after at least two executions of the modified computer program.

15. A partitioning device according to claim 12, said device being adapted to consider data representing a quantity of the part of the information processed by the subprogram.

16. A partitioning device according to claim 12, said device being adapted to consider data representing a transfer time for the part of the information processed by the subprogram.

17. A partitioning device according to claim 12, said device being adapted to consider data representing characteristics of a transmission channel between the first processing site and the second processing site.

18. A partitioning device according to claim 17, said device being adapted to consider data representing the transmission channel chosen from among latency, passband, error rate, mean load on the transmission channel and at least one value dependent on a protocol for communicating the part of the information between the first processing site and the second processing site.

19. A partitioning device according to claim 12, wherein said allocation means are adapted to minimize, by analysis of the representative data, the transfer of information between the first processing site and the second processing site.

20. A partitioning device according to claim 12, wherein said automatic determination and allocation means are incorporated in:
    a central unit,
    a read only memory containing instructions relating to implementation of the partitioning; and
    a random access memory containing registers adapted to record variables modified during the execution of the instructions.

21. A computer, comprising a device according to any one of claims 12 to 20.

* * * * *